United States Patent

Rogers

[11] Patent Number: 5,845,971
[45] Date of Patent: Dec. 8, 1998

[54] SIDE DUMP TRAILER

[75] Inventor: Ralph R. Rogers, South Sioux City, Nebr.

[73] Assignee: Circle R, Inc., So. Sioux City, Iowa

[21] Appl. No.: 823,721

[22] Filed: Mar. 25, 1997

[51] Int. Cl.⁶ ....................................................... B60P 1/16
[52] U.S. Cl. .............................. 298/18; 296/52; 296/181; 410/42; 410/49
[58] Field of Search ................................ 298/18; 296/52, 296/181; 410/36, 42, 49, 47

[56] References Cited

U.S. PATENT DOCUMENTS

| 899,108 | 9/1908 | Hansen | 298/18 |
|---|---|---|---|
| 1,311,644 | 7/1919 | Flom | 296/52 |
| 1,325,495 | 12/1919 | Lee | 298/18 |
| 1,539,492 | 5/1925 | Jefferis | 296/52 |
| 2,072,998 | 3/1937 | Allin | 298/18 |
| 2,530,613 | 11/1950 | Hopper | 298/18 |
| 3,238,897 | 3/1966 | Flowers | 298/18 |
| 3,323,838 | 6/1967 | Trucco et al. | 298/18 |
| 3,508,503 | 4/1970 | Daly | 410/49 |
| 4,494,798 | 1/1985 | Bailey | 298/18 |
| 4,619,484 | 10/1986 | Maxey | 298/18 |
| 4,838,598 | 6/1989 | Hyde | 296/52 |
| 5,211,518 | 5/1993 | Mimica | 410/49 |
| 5,322,350 | 6/1994 | Hinson | 296/181 |
| 5,480,214 | 1/1996 | Rogers | 298/18 |

FOREIGN PATENT DOCUMENTS

WO89/02838  4/1989  European Pat. Off. ................. 298/18

Primary Examiner—Karen M. Young
Assistant Examiner—Douglas Hess
Attorney, Agent, or Firm—Zarley, McKee, Thomte, Voorhees & Sease; Dennis L. Thomte

[57] ABSTRACT

A side dump trailer comprising a trailer body pivotally mounted on a wheeled frame to enable the material within the trailer body to be dumped from one side of the trailer. The body of the trailer is constructed to permit it to transport loose bulk materials or to support elongated rod members or spool members therein.

6 Claims, 7 Drawing Sheets

SIDE DUMP TRAILER

BACKGROUND OF THE INVENTION

1. Field of the Invention

This invention relates to a side dump trailer and more particularly to a side dump trailer which may be used to haul elongated rod members, spool members or loose bulk materials such as scrap metal.

2. Description of the Related Art

Trailers have been used for many years to haul rock, gravel, dirt, rip rap, break-out, etc. One type of trailer previously used is one having an end gate at the rearward end thereof so that the contents of the trailer may be dumped from the rear of the trailer as the forward end of the trailer body is elevated by means of a hydraulic cylinder or the like. One problem associated with a rear tail gate is that the materials in the trailer tend to become clogged at the tail gate area. Further, tail gates sometimes do not fully open or fully close.

In an effort to overcome some of the disadvantages associated with rear dumping trailers, side dump trailers have been provided. One type of side dump trailer is disclosed in U.S. Pat. No. 4,494,798 issued to Clarence W. Bailey on Jan. 22, 1985. Another type of side dump trailer is disclosed in U.S. Pat. No. 5,480,214 issued to the applicant herein on Jan. 2, 1996. Although applicant's earlier patent has met with considerable success, the same was primarily designed for use in hauling loose materials such as gravel, rock, rip rap, break-out, etc.

It has been discovered that a unique situation exists in the steel manufacturing business. For example, many small steel mills have scrap metals delivered thereto by means of trucks or the like. The steel mills convert the scrap metals to elongated rods or coils of steel wound upon spool members. It takes a rather unique type of transport vehicle to transport the elongated rods or steel coils from the factory to the customers for the products. Inasmuch as the trucks which hauled the loose scrap metals to the steel mills are not suitable for transporting the elongated rods or steel coils, different types of trucks are required to transport the finished products. In other words, one type of truck delivers the scrap materials to the steel mill and another type of truck hauls the finished products from the steel mills. In such a situation, the trucks hauling the scrap metals to the steel mills return from the steel mills empty and the trucks hauling the finished products travel to the steel mills empty.

SUMMARY OF THE INVENTION

A side dump trailer has been provided which includes an elongated wheeled frame having a plurality of horizontally spaced-apart first supports on one side thereof and a plurality of horizontally spaced-apart second supports at the other side thereof. An elongated body or tub is movably positioned on the wheeled frame and has an open upper end for receiving materials to be transported. The body includes a bottom wall having first and second side walls extending upwardly and outwardly therefrom. A plurality of horizontally spaced-apart third supports are secured to the outer surface of the first side wall which are adapted to be removably supported by the first supports on the wheeled frame. A plurality of horizontally spaced-apart pivot pins are secured to and are positioned at the outer surface of the second side wall of the body which are pivotally mounted in the second supports on the wheeled frame. A hydraulic cylinder means is operatively connected to the body and the wheeled frame for selectively pivotally moving the body, about the pivot pins, so that the body may be pivotally moved from a non-dumping position to a dumping position. When the body is in its non-dumping position, the third supports on the body are supported by the first supports on the wheeled frame. The interior of the body is substantially open to permit the body to receive loose bulk materials therein such as scrap metal. The body also has support means in its interior for supporting elongated rod members thereon so that the trailer may transport finished rod members therein. The interior of the body is also provided with a means for supporting a plurality of spool members thereon so that the trailer may also be used to transport spool members having coils of steel wrapped thereon.

It is therefore a principal object of the invention to provide an improved side dump trailer.

Yet another object of the invention is to provide a side dump trailer wherein the ends thereof are normally open but may be closed by movable gate members.

Still another object of the invention is to provide a side dump trailer which may be used to transport loose bulk materials such as scrap metal to a steel mill or the like and which may be used to transport elongated rod members or spool members therein after the scrap metals have been dumped therefrom.

Still another object of the invention is to provide a side dump trailer which is durable in use.

These and other objects of the invention will be apparent to those skilled in the art.

DESCRIPTION OF THE PREFERRED EMBODIMENT

Figure 1:
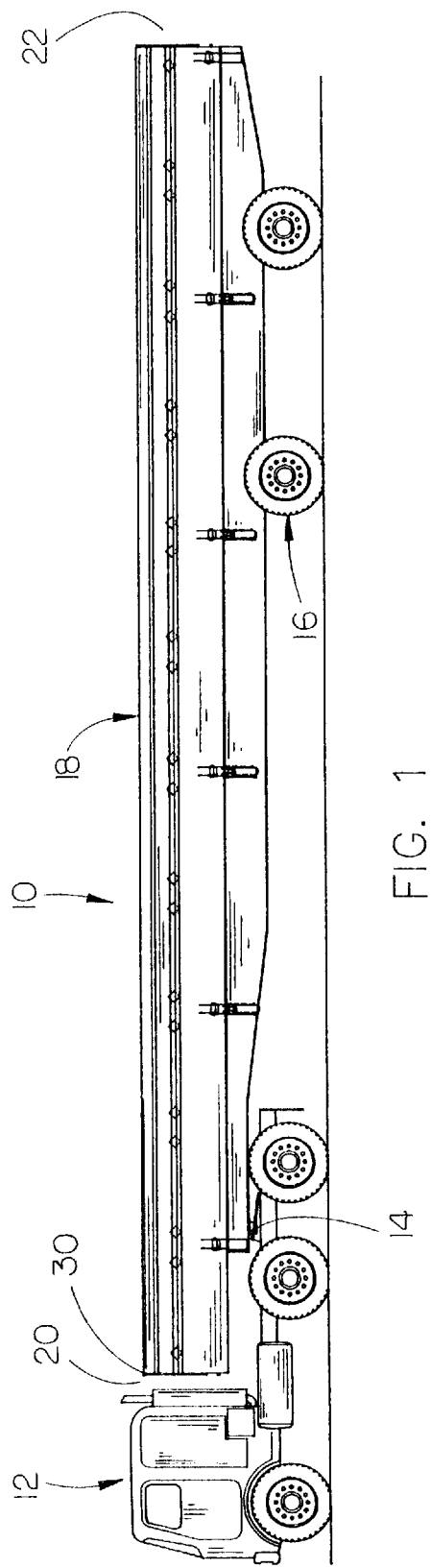
FIG. 1 is a side view as seen from the left side of the side dump trailer of this invention.
Figure 2:
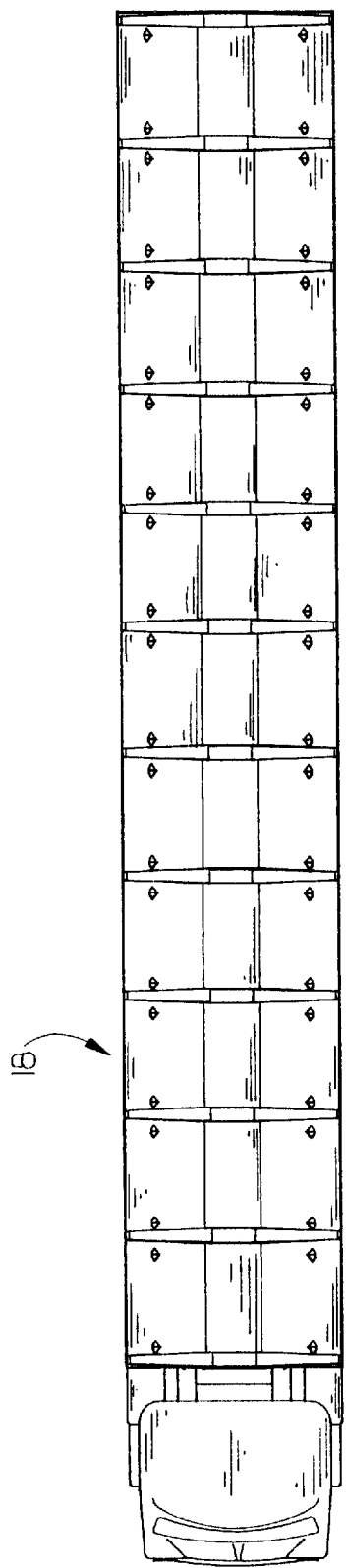
FIG. 2 is a top view of the side dump trailer of this invention.
Figure 3:
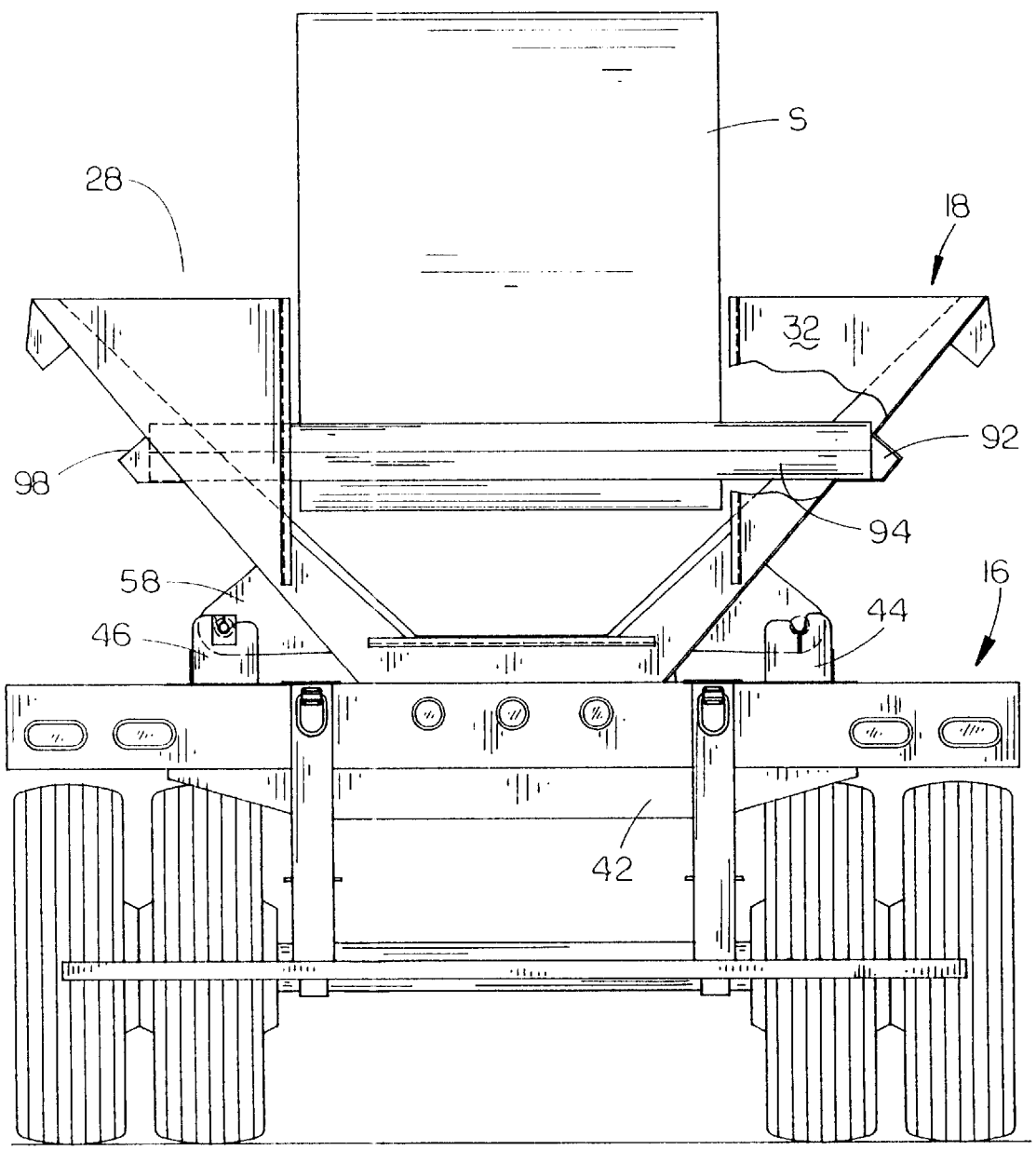
FIG. 3 is a rear elevational view of the side dump trailer of this invention with portions thereof cutaway to more fully illustrate the invention and which shows the trailer being used to transport spool members.
Figure 4:
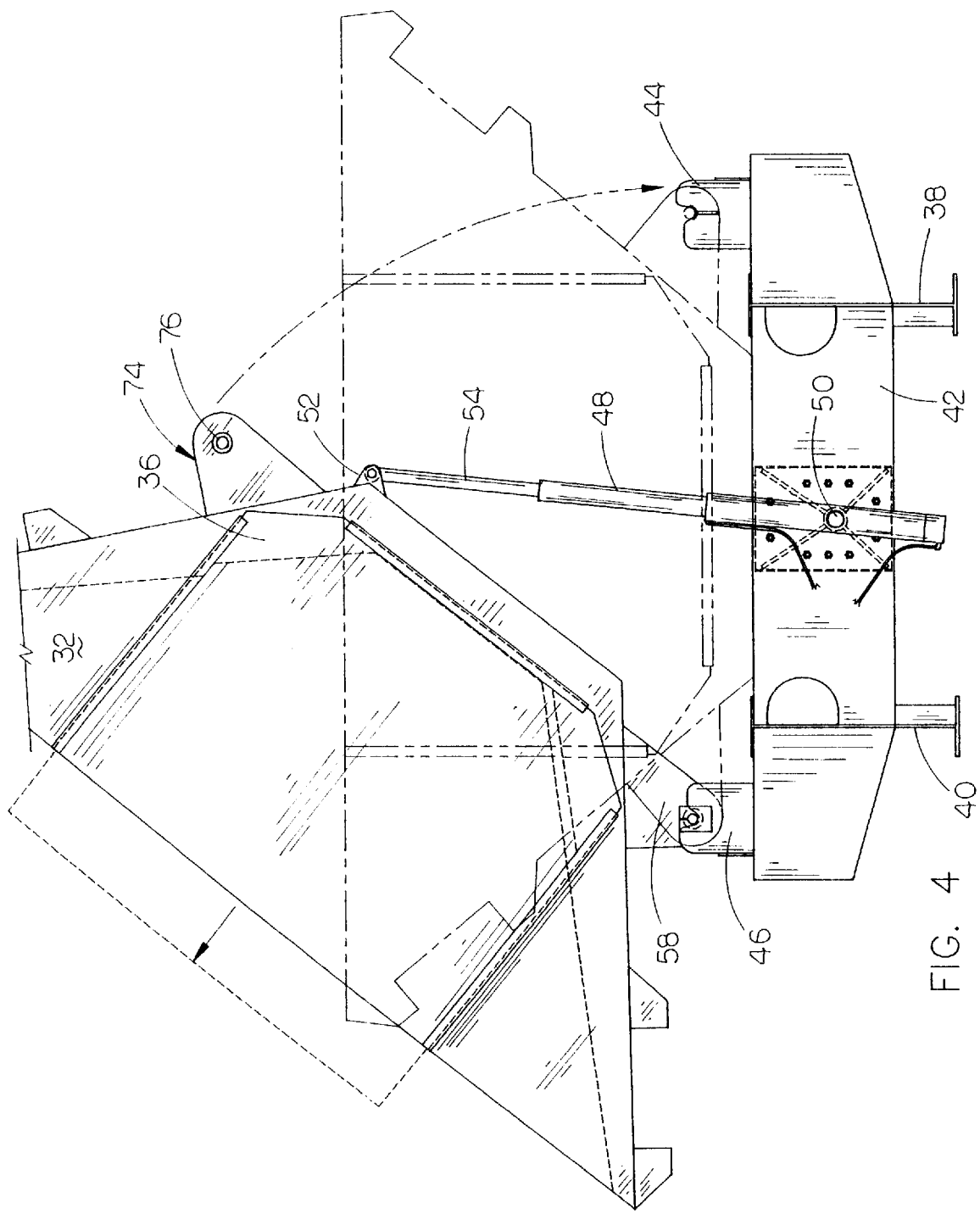
FIG. 4 is a partial rear elevational view illustrating the trailer being moved from a dumping position to a non-dumping position.

The numeral 10 refers generally to the side dump trailer of this invention. Although the drawings illustrate that the side dump trailer 10 is being pulled by a truck 12 having a fifth wheel 14, trailer 10 could be mounted on any suitable truck frame. However, it is preferred that the trailer 10 be pulled by a truck 12 through the fifth wheel 14. Trailer 10 includes a wheeled frame 16 having a body 18 mounted thereon as will be described in more detail hereafter. For purposes of description, the body 18 will be described as including a forward end 20, rearward end 22. Body 18 also includes bottom wall 23 and side walls 24 and 26 extending upwardly and outwardly therefrom to define an open upper end 28.

Figure 5:
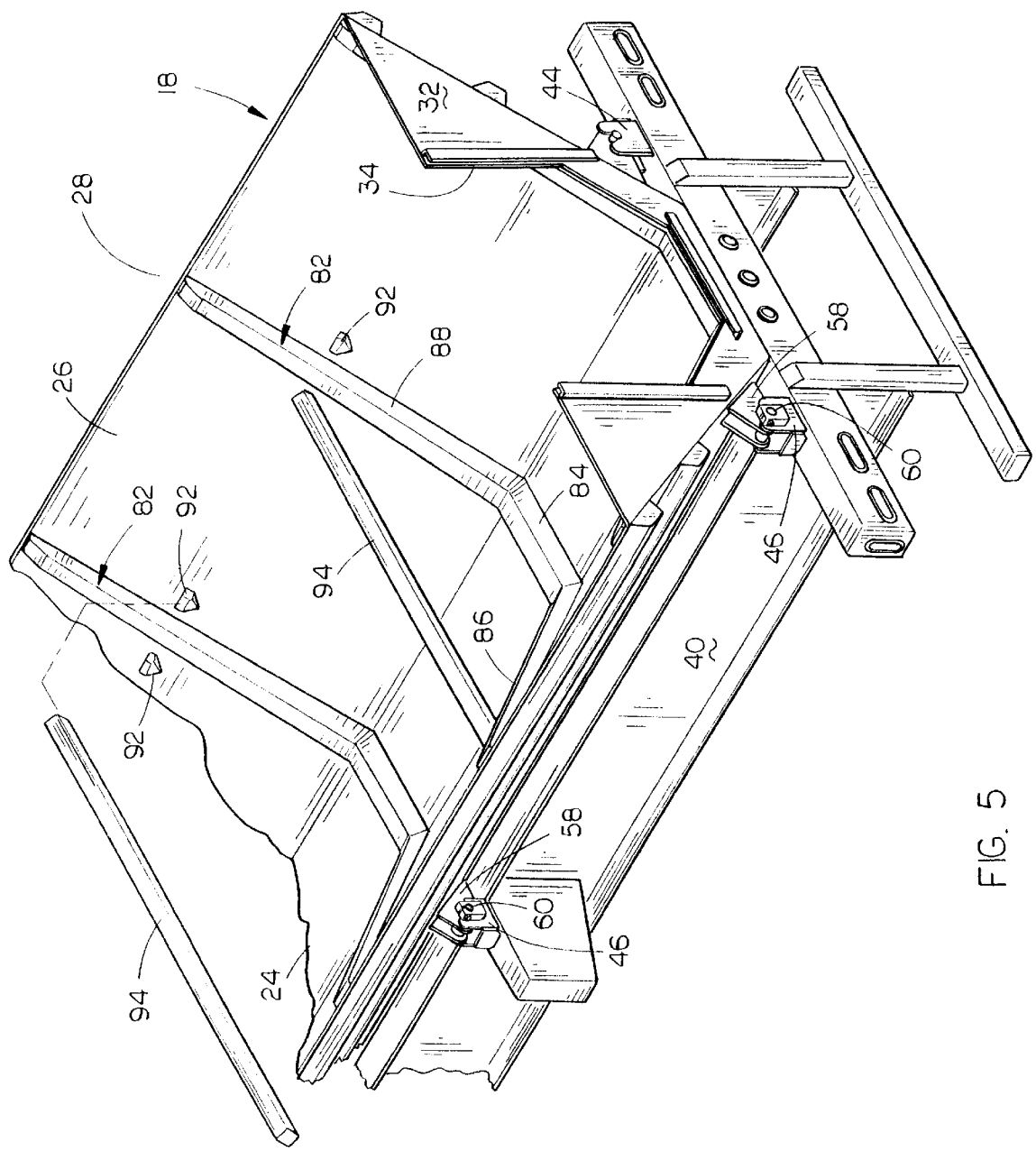
FIG. 5 is a partial top rear perspective view of the trailer of this invention.

The forward end of the body 18 is defined by a front bulkhead 30 while the rearward end of the body 18 is defined by a rear bulkhead 32. As seen in FIG. 5, rear bulkhead 32 is provided with an opening referred to generally by the reference numeral 34 provided therein which is adapted to receive a rear gate 36 therein to close the rear bulkhead 32. Similarly, the front bulkhead 30 is also provided with an opening formed therein which is closed by a gate in the same fashion as rear bulkhead 32.

Figure 6:
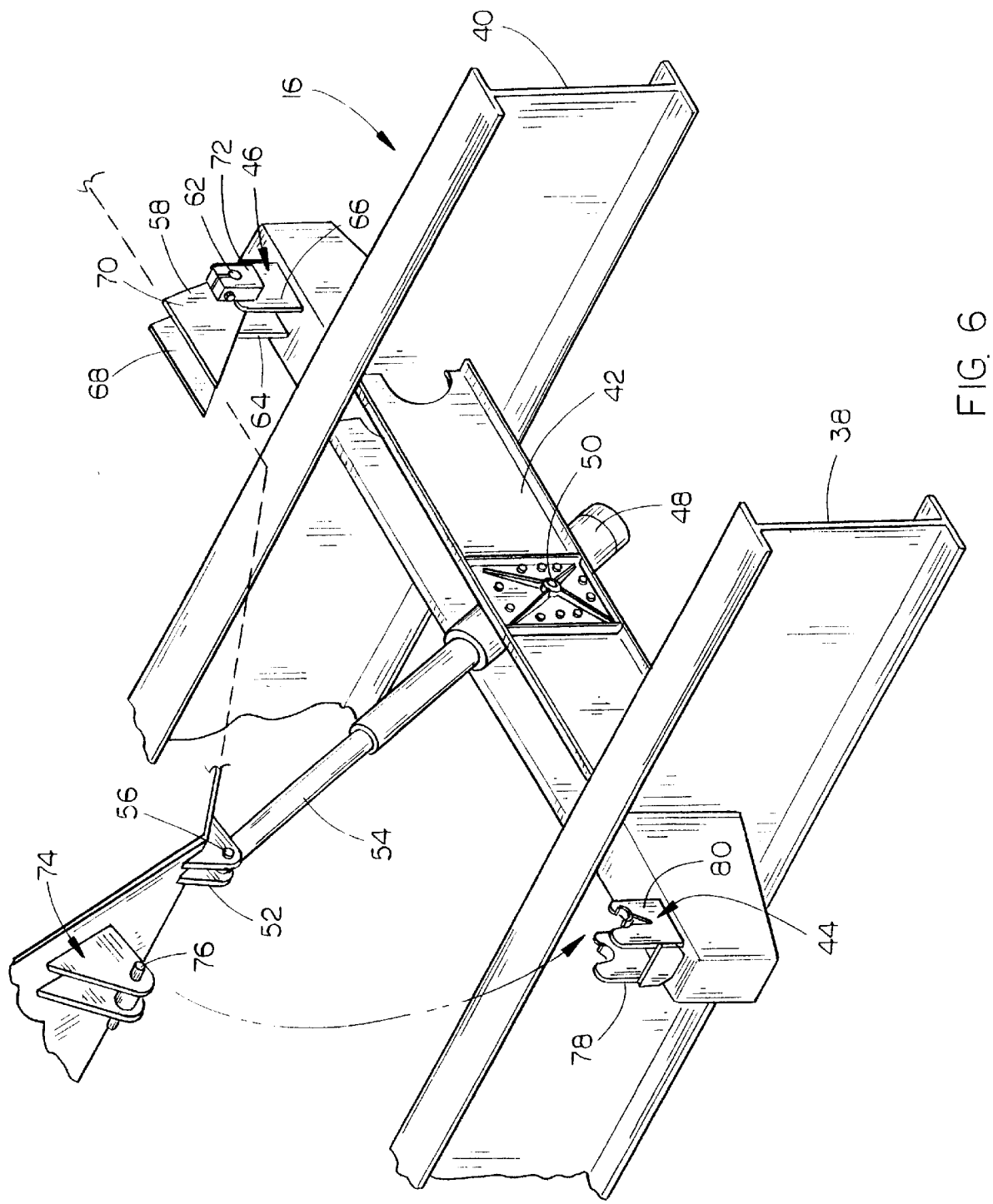
FIG. 6 is a partial perspective view illustrating one of the hydraulic cylinders which pivotally move the trailer body with respect to the wheeled frame.

Wheeled frame 16 includes at least a pair of longitudinally extending frame members 38 and 40 having a plurality of transversely extending frame members 42 extending therebetween as best seen in FIG. 6. The right ends, as seen from the rear of the trailer, of frame members 42 protrude laterally outwardly from frame member 38 and have supports 44 mounted thereon. The left ends of frame members 42 protrude laterally outwardly from frame member 40 and have supports 46 mounted thereon.

A plurality of horizontally spaced-apart hydraulic cylinders 48 are provided along the length of the wheeled frame 16 with the hydraulic cylinders being pivotally connected to a frame member 42 at 50. The number of hydraulic cylinders 48 which are utilized on a particular trailer will be dependent upon the length of the trailer and the weight of the materials being carried in the trailer. Body 18 is provided with an appropriate number of horizontally spaced-apart brackets 52 provided thereon to enable the rods 54 of cylinders 48 to be pivotally connected thereto by means of pins 56.

A plurality of horizontally spaced-apart supports 58 are provided along the length of the exterior surface of side wall 24, as best seen in FIG. 5. The supports 58 are pivotally connected to the supports 46 by means of pins 60 which extend through the plates 64 and 66 of supports 46 and through the plates 68 and 70 of the supports 58. Pins 62 are held in place by means of retainers 72 mounted on the outer ends thereof.

The lower exterior surface of side wall 26 has a plurality of horizontally spaced-apart supports 74 provided thereon having a pin 76 extending outwardly from the rearward and forward ends thereof, as best seen in FIG. 6. The ends of pin 76 are adapted to be received by the arcuate upper ends of the plates 78 and 80 of supports 44.

Figure 7:
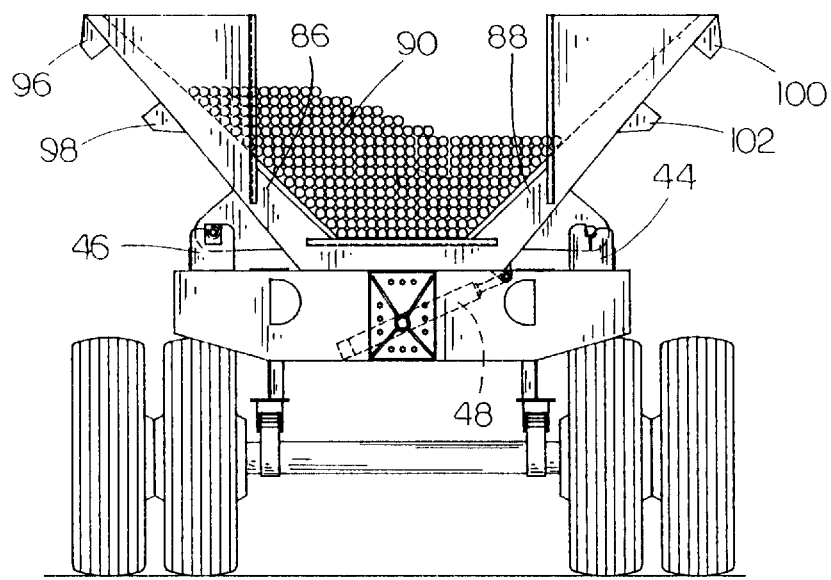
FIG. 7 is a rear elevational view of the trailer illustrating the trailer being used to transport elongated rod members.
Figure 8:
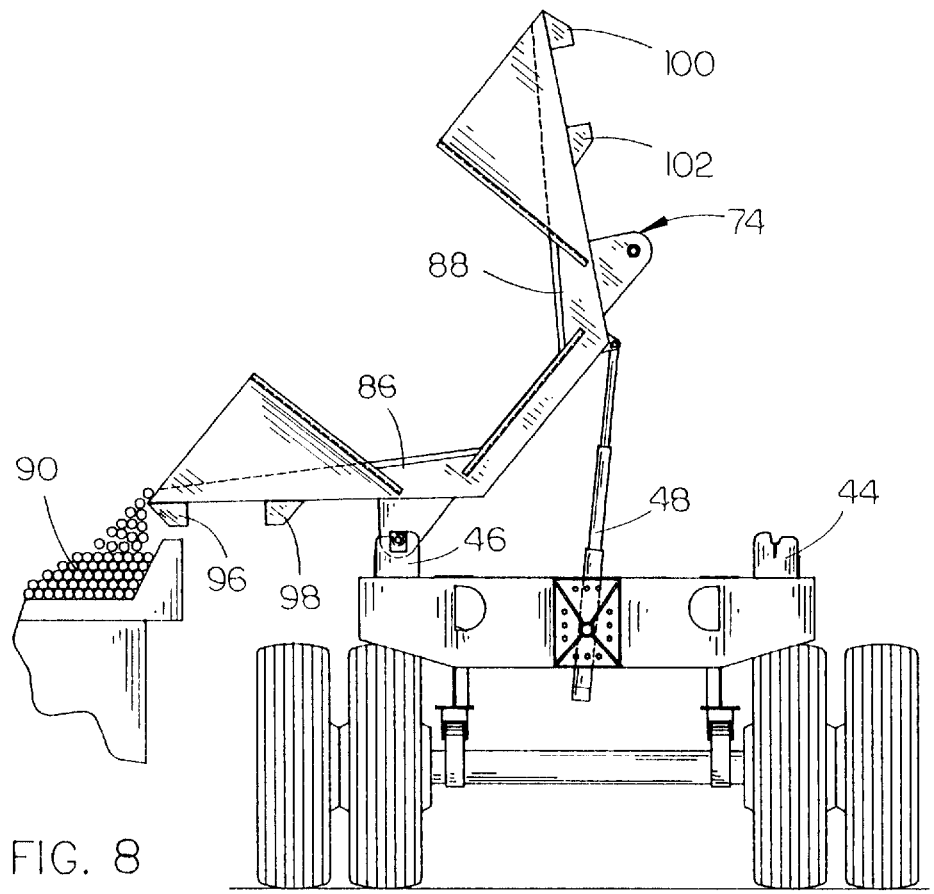
FIG. 8 is a view similar to FIG. 7 except that the body of the trailer has been moved to a dumping position.
Figure 9:
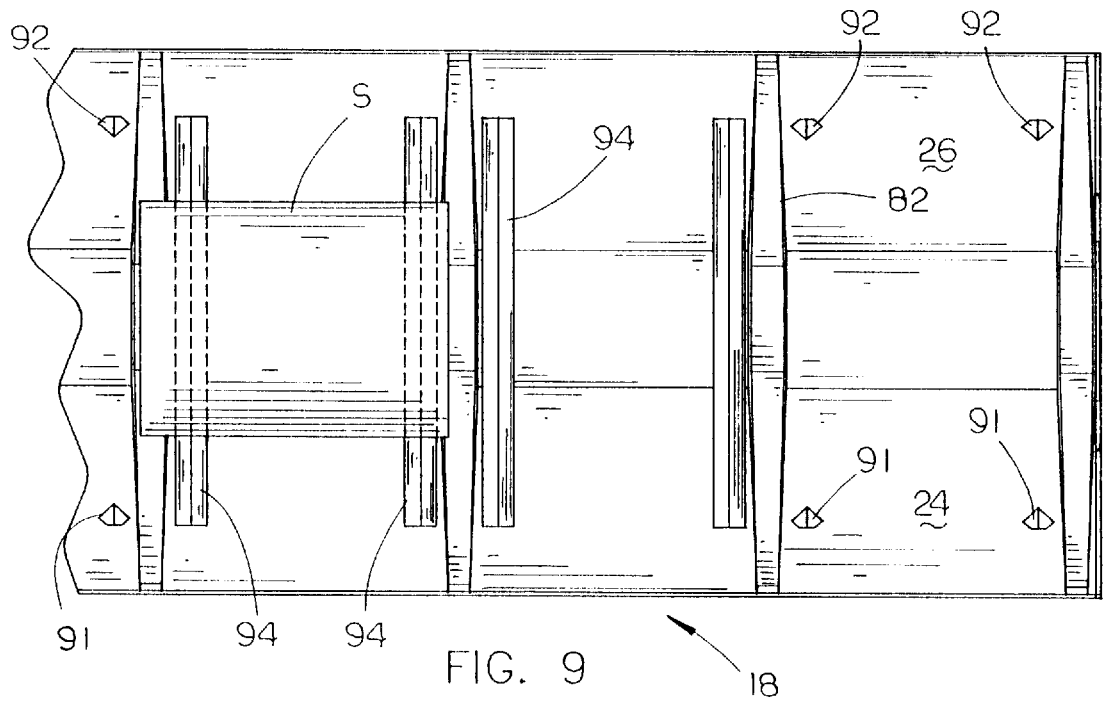
FIG. 9 is a partial top elevational view of the trailer illustrating the trailer being used to haul spool members.

The interior surface of body 18 is provided with a pair of horizontally spaced-apart U-shaped rib or support members 82, each of which are comprised of a base portion 84 and legs 86 and 88. As perhaps best seen in FIGS. 7 and 8, the legs 86 and 88 of ribs 82 are tapered so that the rod members 90 supported thereon, as will be described in more detail hereinafter, will roll therefrom without the necessity of pivotally moving the body 18 greater than that which is shown in FIG. 8.

Side wall 24 is provided with a plurality of horizontally spaced-apart pockets or openings 91 formed therein while the interior surface of side wall 26 is provided with a plurality of horizontally spaced-apart pockets 92 formed therein. The pockets 91 and 92 are adapted to removably receive the ends of elongated support members 94.

A pair of horizontally disposed, elongated strengthening ribs 96 and 98 are secured to the exterior surface of wall 24 while horizontally disposed, elongated strengthening ribs 100 and 102 are secured to the exterior surface of side wall 26. Ribs 98 and 102 are essentially hollow and receive the outer ends of the support members 94 when they are positioned in the pockets 90 and 92.

When it is desired to use the side dump trailer of this invention to haul loose bulk materials such as scrap metals or the like, the end gates are installed in the forward and rearward bulkheads to close the openings therein. The support members 94 will not be in position at this time. The loose bulk materials are then simply dumped into the interior of the body 18 through the open upper end 28 to enable the interior thereof to be filled with the loose bulk materials. The trailer is then driven to the steel mill or the like and the loose bulk materials may be dumped from the left side thereof by causing the hydraulic cylinders 48 to be extended which will cause the body 18 to pivotally move from the non-dumping position illustrated in FIG. 1 to the dumping position illustrated in FIG. 8. As the hydraulic cylinders 48 are extended, the body 18 pivots about the pins 60 which interconnect the supports 46 and 58 spaced along the exterior surface of the body. When the materials have been dumped from the side dump trailer, the hydraulic cylinders 48 are then retracted to return the body to its non-dumping position. At that time, if it is desired to transport elongated rod members, such as rod members 90, as seen in FIG. 7, from the steel mill to a customer, the elongated rod members 90 are positioned in the body so as to be supported on the U-shaped supports 82. As the rod members 90 are being transported to the customer, the end gates would normally close the forward and rearward bulkheads of the trailer. However, if the rod members 90 are longer than the body 18, the end gates may be removed with the ends of the rod members being extended through the end gate openings.

When the trailer arrives at the customer's location, the elongated rod members 90 may be dumped from the body 18 by simply extending the hydraulic cylinders 48, as previously described, so that the elongated members will roll from the supports 82 in the body 18, as illustrated in FIG. 8, and as previously described.

Figure 10:
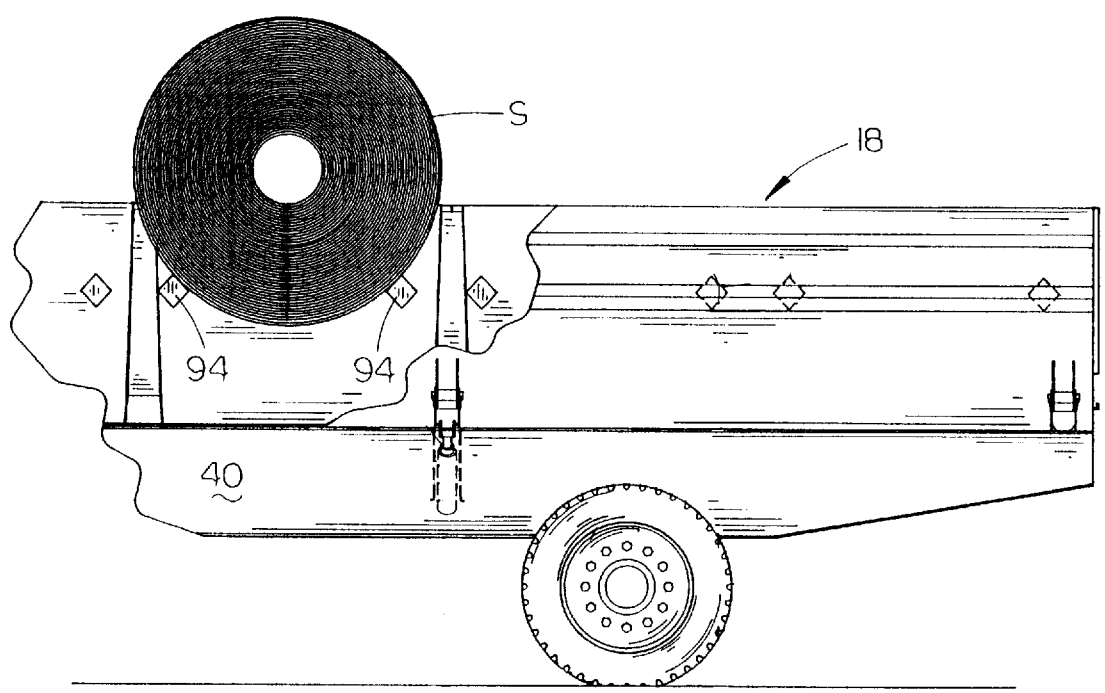
FIG. 10 is a partial side elevational view of the trailer with portions thereof being cutaway to illustrate the manner in which the spool members are supported in the body of the trailer.

If the trailer is used to transport coils of steel from the factory to the customer, rather than the elongated rod members 90, the support members 94 are installed in the body 18 by inserting the ends thereof into the pockets 91 and 92 so that the support members 94 extend between side walls 24 and 26, as illustrated in the drawings. When the support members 94 are installed as illustrated in FIG. 10, the spools or spool members S are lowered into the interior of the body 18 so as to rest upon a pair of support members 94, as illustrated in FIG. 10. The number of spools S which may be accommodated by the trailer will obviously depend upon the length of the trailer.

It should be noted that there may be situations where the steel mill and the customer will have the necessary equipment to manually move the body 18 between its dumping and non-dumping positions. In such a situation, there is no need to provide the hydraulic cylinders 48 on the trailer. Also, in such a situation, the supports 46 and 58 at one side of the body 18 could be replaced with supports such as supports 44 and 74 to enable the body to be dumped in either direction. In such an embodiment, it is recommended that locking devices such as described in U.S. Pat. No. 5,480,214 be utilized. It should also be noted that although the body 18 shown in the drawings is dumped to the left, as viewed from the rear of the body 18, the body 18 could be dumped to the right, if so desired.

Thus it can be seen that a novel side dump trailer has been provided which may be used to transport loose bulk materials such as scrap metals or the like to a steel mill and wherein the trailer may then be used to transport finished products such as elongated rod members or steel coils to a customer. When the side dump trailer of this invention is utilized as described, the number of trucks required to haul materials to and from the steel mill is cut in half.

Thus it can be seen that the invention accomplishes at least all of its stated objectives.

I claim:

1. A side dump trailer, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

an elongated body movably positioned on said wheeled frame and having a forward end, a rearward end, opposite sides, and an open upper end for receiving materials to be transported;

said body including a bottom wall and first and second side walls extending upwardly and outwardly from said bottom wall;

said first and second side walls having inner and outer surfaces;

a plurality of horizontally spaced-apart third supports secured to said outer surface of said first side wall adapted to be removably supported by said first supports;

a plurality of horizontally spaced-apart pivot pins secured to and positioned at said outer surface of said second side wall of said body which are pivotally mounted in said second supports;

a power cylinder means operatively connected to said body and said wheeled frame for selectively pivotally moving said body about said pivot pins, whereby said body may be selectively moved from a non-dumping position to a dumping position;

said third supports being supported by said first supports when said body is in its non-dumping position;

the interior of said body being substantially open to permit said body to receive loose bulk materials therein;

said body having support means in its interior for supporting elongated members therein;

said support means in said interior of said body for supporting elongated members comprising a plurality of generally U-shaped rib members which protrude into the interior of said body from said bottom wall and said side walls.

2. The side dump trailer of claim 1 wherein the interior of said body is also provided with means for supporting a plurality of spool members therein.

3. A side dump trailer, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

an elongated body movably positioned on said wheeled frame and having a forward end, a rearward end, opposite sides, and an open upper end for receiving materials to be transported;

said body including a bottom wall and first and second side walls extending upwardly and outwardly from said bottom wall;

said first and second side walls having inner and outer surfaces;

a plurality of horizontally spaced-apart third supports secured to said outer surface of said first side wall adapted to be removably supported by said first supports;

a plurality of horizontally spaced-apart pivot pins secured to and positioned at said outer surface of said second side wall of said body which are pivotally mounted in said second supports;

a power cylinder means operatively connected to said body and said wheeled frame for selectively pivotally moving said body about said pivot pins, whereby said body may be selectively moved from a non-dumping position to a dumping position;

said third supports being supported by said first supports when said body is in its non-dumping position;

the interior of said body being substantially open to permit said body to receive loose bulk materials therein;

the interior of said body being provided with pocket means which receive elongated rods for supporting a plurality of spool members thereon.

4. A side dump trailer, comprising:

an elongated wheeled frame having a forward end, a rearward end, and opposite sides;

a plurality of horizontally spaced-apart second supports on said wheeled frame at one side thereof;

a plurality of horizontally spaced-apart second supports on said wheeled frame at the other side thereof;

an elongated body movably positioned on said wheeled frame and having a forward end, a rearward end, opposite sides, and an open upper end for receiving materials to be transported;

said body including a bottom wall and first and second side walls extending upwardly and outwardly from said bottom wall;

said first and second side walls having inner and outer surfaces;

a plurality of horizontally spaced-apart third supports secured to said outer surface of said first side wall adapted to be removably supported by said first supports;

a plurality of horizontally spaced-apart pivot pins secured to and positioned at said outer surface of said second side wall of said body which are pivotally mounted in the second supports;

a power cylinder means operatively connected to said body and said wheeled frame for selectively pivotally moving said body about said pivot pins, whereby said body may be selectively moved from a non-dumping position to a dumping position;

said third supports being supported by said first supports when said body is in its non-dumping position;

the interior of said body being substantially open to permit said body to receive loose bulk materials therein;

the interior of said body being provided with means for supporting a plurality of spool members therein;

said means for supporting a plurality of space members therein comprising:
 a plurality of horizontally spaced-apart pockets provided on the inside surfaces of said side walls of said body, and elongated support members having opposite ends removably received by said pockets whereby said support members extend horizontally between said side walls of said body and said spool members are supported thereon.

5. A side dump trailer, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

an elongated body movably positioned on said wheeled frame and having a forward end, a rearward end, opposite sides, and an open upper end for receiving materials to be transported;

said body including a bottom wall and first and second side walls extending upwardly and outwardly from said bottom wall;

said first and second side walls having inner and outer surfaces;

a plurality of horizontally spaced-apart third supports secured to said outer surface of said first side wall adapted to be removably supported by said first supports;

a plurality of horizontally spaced-apart pivot pins secured to and positioned at said outer surface of said second side wall of said body which are pivotally mounted in said second supports;

a power cylinder means operatively connected to said body and said wheeled frame for selectively pivotally moving said body about said pivot pins, whereby said body may be selectively moved from a non-dumping position to a dumping position;

said third supports being supported by said first supports when said body is in its non-dumping position;

the interior of said body being substantially open to permit said body to receive loose bulk materials therein;

said body having support means in its interior for supporting elongated members therein;

said forward and rearward ends of said body being normally open but being selectively closable.

6. A side dump trailer, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

an elongated body movably positioned on said wheeled frame and having a forward end, a rearward end, opposite sides, and an open upper end for receiving materials to be transported;

said body including a bottom wall and first and second side walls extending upwardly and outwardly from said bottom wall;

said first and second side walls having inner and outer surfaces;

a plurality of horizontally spaced-apart pivot pins secured to said outer surface of said first side wall adapted to be removably and pivotally supported in said first supports;

a plurality of horizontally spaced-apart pivot pins secured to said outer surface of said second side wall of said body which are adapted to be removably and pivotally mounted in said second supports;

means adapted to be operatively connected to said body for selectively pivotally moving said body about said pivot pins, whereby said body may be selectively moved from a non-dumping position to a dumping position;

the interior of said body being substantially open to permit said body to receive loose bulk materials therein;

the interior of said body being provided with means for supporting a plurality of spool members therein;

said means for supporting a plurality of spool members therein comprising:
 a plurality of horizontally spaced-apart pockets provided on the inside surfaces of said side walls of said body, and elongated support members having opposite ends removably received by said pockets whereby said support members extend horizontally between said side walls of said body and said spool members are supported thereon.

* * * * *